US009262604B2

(12) United States Patent
Kimbrell

(10) Patent No.: US 9,262,604 B2
(45) Date of Patent: Feb. 16, 2016

(54) METHOD AND SYSTEM FOR LOCKING AN ELECTRONIC DEVICE

(75) Inventor: Jacob Warren Kimbrell, Raleigh, NC (US)

(73) Assignee: BlackBerry Limited, Waterloo, Ontario (CA)

(*) Notice: Subject to any disclaimer, the term of this patent is extended or adjusted under 35 U.S.C. 154(b) by 335 days.

(21) Appl. No.: 13/363,880

(22) Filed: Feb. 1, 2012

(65) Prior Publication Data

US 2013/0194067 A1 Aug. 1, 2013

(51) Int. Cl.
G05B 23/00 (2006.01)
G06F 21/31 (2013.01)
H04M 1/673 (2006.01)

(52) U.S. Cl.
CPC ............... *G06F 21/31* (2013.01); *H04M 1/673* (2013.01); *G06F 2221/2137* (2013.01)

(58) Field of Classification Search
CPC .. G06F 2221/2137; G06F 21/88; G06F 21/62
See application file for complete search history.

(56) References Cited

U.S. PATENT DOCUMENTS

| 4,945,556 A | 7/1990 | Namekawa |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,105,132 A | 8/2000 | Fritch et al. |
| 6,233,446 B1 | 5/2001 | Do |
| 6,292,798 B1 | 9/2001 | Dockter et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,516,421 B1 | 2/2003 | Peters |
| 6,647,388 B2 | 11/2003 | Numao et al. |
| 6,668,323 B1 | 12/2003 | Challener et al. |

(Continued)

FOREIGN PATENT DOCUMENTS

| CN | 101523878 A | 9/2009 |
| EP | 0973350 | 1/2000 |

(Continued)

OTHER PUBLICATIONS www.cs.rutgera.edu/~waltrous/user-pass-url.html, Jan. 28, 2004.*

(Continued)

*Primary Examiner* — Ojiako Nwugo
(74) *Attorney, Agent, or Firm* — Fish & Richardson P.C.

(57) ABSTRACT

A method and a system for locking an electronic device are provided. In one aspect, a method in an electronic device is provided comprising the steps of receiving, through a user input interface of the device when the device is in a locked state, a challenge response and a temporary automatic lock time indicator, and if the challenge response is accepted, unlocking the device, setting an automatic lock timer of the device to a temporary lock time value, and starting the automatic lock timer. In another aspect, an electronic device is provided for implementing the above method. According to another aspect, a locking mechanism is provided that utilizes information on an environment of the electronic device. According to another aspect, a stimulus based locking mechanism is provided that employs a different lock time after the device has issued a stimulus in response to an event on the device.

15 Claims, 11 Drawing Sheets

(56) References Cited

U.S. PATENT DOCUMENTS

| | | | |
|---|---|---|---|
| 6,757,821 | B1 | 6/2004 | Akiyama et al. |
| 6,772,350 | B1 | 8/2004 | Belani et al. |
| 6,795,688 | B1 | 9/2004 | Plasson et al. |
| 6,795,967 | B1 | 9/2004 | Evans et al. |
| 6,886,038 | B1 | 4/2005 | Tabbara et al. |
| 6,957,330 | B1 | 10/2005 | Hughes |
| 6,978,385 | B1 | 12/2005 | Cheston et al. |
| 6,999,562 | B2 | 2/2006 | Winick |
| 7,246,374 | B1 | 7/2007 | Simon et al. |
| 7,331,058 | B1 | 2/2008 | Gladney |
| 7,400,878 | B2 | 7/2008 | Hassan et al. |
| 7,574,200 | B2 | 8/2009 | Hassan et al. |
| 7,734,284 | B2 | 6/2010 | Adams et al. |
| 7,869,789 | B2 | 1/2011 | Hassan et al. |
| 8,074,078 | B2 | 12/2011 | Brown et al. |
| 2001/0047485 | A1 | 11/2001 | Brown et al. |
| 2002/0019944 | A1 | 2/2002 | Kou |
| 2002/0031230 | A1 | 3/2002 | Sweet et al. |
| 2002/0087880 | A1 | 7/2002 | Rhoades et al. |
| 2002/0095414 | A1 | 7/2002 | Barnett et al. |
| 2002/0095497 | A1 | 7/2002 | Satagopan et al. |
| 2002/0112155 | A1 | 8/2002 | Martherus et al. |
| 2003/0005317 | A1 | 1/2003 | Audebert et al. |
| 2003/0026220 | A1 | 2/2003 | Uhlik et al. |
| 2003/0065676 | A1 | 4/2003 | Gbadegesin et al. |
| 2003/0093698 | A1* | 5/2003 | Challener et al. ............. 713/202 |
| 2003/0120948 | A1 | 6/2003 | Schmidt et al. |
| 2003/0126437 | A1 | 7/2003 | Wheeler et al. |
| 2003/0163685 | A1 | 8/2003 | Paatero |
| 2003/0177389 | A1 | 9/2003 | Albert et al. |
| 2003/0226015 | A1 | 12/2003 | Neufeld et al. |
| 2003/0236983 | A1 | 12/2003 | Mihm |
| 2004/0001101 | A1 | 1/2004 | Trajkovic et al. |
| 2004/0083382 | A1 | 4/2004 | Markham et al. |
| 2004/0100983 | A1 | 5/2004 | Suzuki et al. |
| 2004/0209608 | A1 | 10/2004 | Kouznetsov et al. |
| 2005/0154935 | A1 | 7/2005 | Jin |
| 2005/0164687 | A1 | 7/2005 | DiFazio |
| 2005/0210270 | A1 | 9/2005 | Rohatgi et al. |
| 2005/0213763 | A1 | 9/2005 | Owen et al. |
| 2005/0245272 | A1 | 11/2005 | Spaur et al. |
| 2006/0059556 | A1 | 3/2006 | Royer |
| 2006/0070114 | A1 | 3/2006 | Wood et al. |
| 2006/0129848 | A1 | 6/2006 | Paksoy et al. |
| 2006/0129948 | A1 | 6/2006 | Hamzy et al. |
| 2006/0156026 | A1 | 7/2006 | Utin |
| 2006/0212589 | A1 | 9/2006 | Hayer et al. |
| 2007/0073694 | A1 | 3/2007 | Picault et al. |
| 2007/0277127 | A1 | 11/2007 | Carlson et al. |
| 2008/0081609 | A1 | 4/2008 | Burgan et al. |
| 2008/0222711 | A1 | 9/2008 | Michaelis |
| 2010/0279652 | A1* | 11/2010 | Sharp et al. .................... 455/410 |
| 2010/0319053 | A1 | 12/2010 | Gharabally |
| 2011/0145833 | A1 | 6/2011 | De Los Reyes et al. |
| 2011/0314467 | A1 | 12/2011 | Pearson |
| 2012/0054853 | A1 | 3/2012 | Gupta et al. |
| 2012/0124640 | A1 | 5/2012 | Bender et al. |
| 2012/0144196 | A1 | 6/2012 | Owen et al. |
| 2012/0202527 | A1 | 8/2012 | Obradovich et al. |

FOREIGN PATENT DOCUMENTS

| | | |
|---|---|---|
| GB | 2408179 A | 5/2005 |
| WO | 9905814 A2 | 2/1999 |
| WO | 0059225 | 10/2000 |
| WO | 2004017592 A1 | 2/2004 |
| WO | 2005045550 A2 | 5/2005 |
| WO | 2009014975 A1 | 1/2009 |

OTHER PUBLICATIONS

U.S. Appl. No. 10/524,353, office action dated Sep. 21, 2012.
Cross-site request forgery (Nov. 30, 2008): http://en.wikipedia.org/wiki/Cross-site_request_forgery.
Digital Access Authentication (Dec. 23, 2009): http://en.wikipedia.org/wiki/Digest_access_authentication.
International Application No. PCT/CA 03/01245, International Search Report dated Dec. 23, 2003.
International Application No. PCT/CA 03/01245, PCT Written Opinion, dated Apr. 23, 2004.
International Application No. PCT/CA 03/01245, PCT Written Opinion, dated Sep. 20, 2004.
International Application No. PCT/CA 03/01245, PCT International Preliminary Examination Report, dated Nov. 29, 2004.
Basic Access Authentication (Jan. 23, 2010): http://en.wikipedia.org/wiki/Basic_access_authentication.
Smartphone Security Beyond Lock and Wipe (Jun. 10, 2010): http://www.enterprisemobiletoday.com/article.php/3887006.
Non-Final Office Action mailed Sep. 13, 2012, in corresponding U.S. Appl. No. 13/098,456.
Olzak, Tom, IT Security (Dec. 15, 2008) "Use free sandboxing software to isolate risky behaviour". http://www.techrepublic.com/blog/security/use-free-sandboxing-software-to-isolate-risky-behavior/693.
Wikipedia "Operating system-level virtualization" http://en.wikipedia.org/wiki/Operating_system-level_virtualization, page last modified on Dec. 28, 2008 and retrieved on Jan. 30, 2012.
Wikipedia "Solaris Containers" http://en.wikipedia.org/wiki/Solaris_Containers, page last modified on Mar. 16, 2010 and retrieved on Jan. 30, 2012.
Morello, John (Oct. 2006). "Communication & Collaboration: Building an Emergency Operations Center on Groove and SharePoint". TechNet Magazine. Microsoft Corporation. http://technet.microsoft.com/en-us/magazine/2006.10.grooveandsharepoint.aspx.
Microsoft SharePoint Workspace http://en.wikipedia.org/wiki/Microsoft_SharePoint_Workspace, page last modified on Jan. 6, 2012 and retrieved on Jan. 30, 2012.
Chou, Yung (Oct. 2006). "Communication & Collaboration: Get into the Groove: Solutions for Secure and Dynamic Collaboration". TechNet Magazine. Microsoft Corporation. http://technet.microsoft.com/en-us/magazine/2006.10.intothegroove.aspx.
Lawson, Stephen, IDG News (Mar. 24, 2011) "PlayBook Will Need BlackBerry Tethering, to Start". PCWorld. http://www.pcworld.com/article/223274/playbook_will_need_blackberry_tethering_to_start.html.
Atkins, Lucas (Mar. 11, 2011) "First Look at BlackBerry Mobile HotSpot, Tethering for OS 6.1". http://n4bb.com/5027/first-look-at-blackberry-mobile-hotspot-tethering-os-6-1.
Hamblen, Matt, Computerworld (Jan. 13, 2011) "PlayBook to allow tethering to BlackBerry smartphones" http://www.computerworld.com/s/article/9204960/PlayBook_to_allow_tethering_to_BlackBerry_smartphones.
International Search Report and the Written Opinion of the International Searching Authority mailed Dec. 21, 2011, in corresponding PCT application No. PCT/CA2011/001058.
Wikipedia, "Disk encryption" retrieved from http://en.wikipedia.org/wiki/Full_disk_encryption, page last modified on Jan. 25, 2012 and retrieved on Jan. 30, 2012.
EP Application No. 12155659.1, Extended European Search Report dated Jan. 8, 2012.
Extended European Search Report mailed Jul. 13, 2012 , in corresponding European patent application No. 12153439.0.
"Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf).
"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf).
EagleVision: A Pervasive Mobile Device Protection System, Ka Yang, Nalin Subramanian, Daji Qiao, and Wensheng Zhang, Iowa State Unviersity (URL: http://www.cs.iastate.edu/~wzhang/papers/eagleVision.pdf).
"Using context-profiling to aid access control decisions in mobile devices", Gupta et al., Nokia Research Center (URL: http://www.cerias.purdue.edu/assets/symposium/2011-posters/372-C48.pdf) Please refer to the 1-page file named 372-C48.pdf.
Office Action mailed Jun. 12, 2014; in corresponding Canadian patent application No. 2,802,274.

* cited by examiner

METHOD AND SYSTEM FOR LOCKING AN ELECTRONIC DEVICE

FIELD OF THE DISCLOSURE

The present disclosure relates generally to access control in electronic devices, and more particularly to challenge based locking mechanisms in electronic devices.

BACKGROUND

Many electronic devices including mobile devices have at least one challenge based locking mechanism for improving the security of the device and any data stored on the device. A challenge, such as a password prompt, can be used to authenticate a user who is attempting to access or use a device or system. One challenge based locking mechanism is the locking feature on a mobile device. A challenge based locking mechanism can allow a device to be put into a locked state, in which user access to some or all of the functionality of the device is temporarily disabled. The device may be switched into an unlocked state upon the successful completion of a challenge, meaning that user access to some or all of the functionality of the device is enabled.

A locking mechanism in a device can allow for the manual locking of the device. In addition, many devices have a locking mechanism that automatically engages when the device has been idle for a particular amount of time. A device is generally considered to be idle if there is no input being provided to the device by a user. Such automatic locking mechanisms serve as a safeguard in the event that the last user of the device forgets or otherwise does not lock the device when the user is no longer using the device to ensure the device is secure if it is lost or stolen.

BRIEF DESCRIPTION OF THE DRAWINGS

The present disclosure will be better understood having regard to the drawings in which.

DETAILED DESCRIPTION

Figure 1:
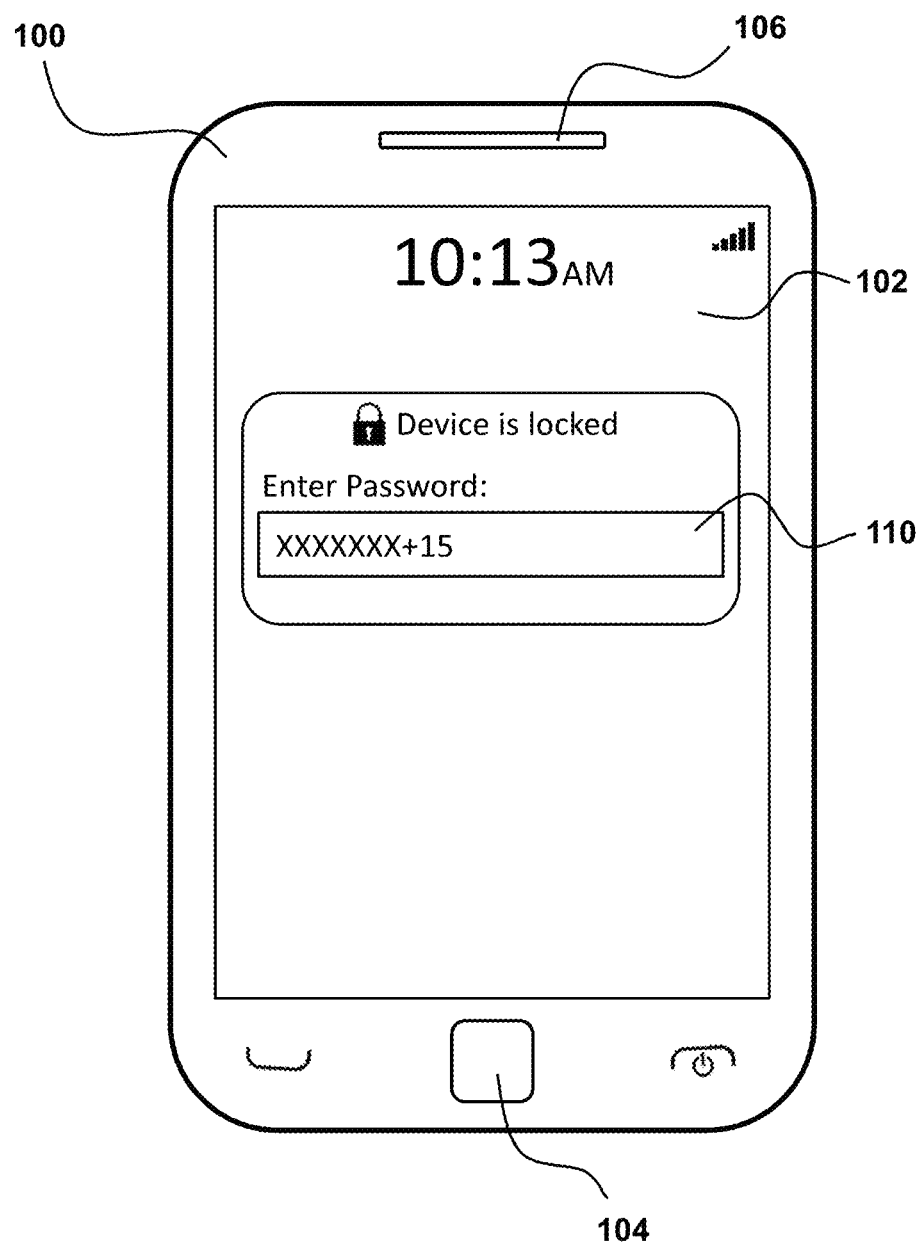
FIG. 1 is a front view of an example mobile device showing a device unlock user interface screen according to one aspect of the present disclosure.

The present disclosure provides a method in an electronic device, the method comprising receiving, through a user input interface of the device when the device is in a locked state, a challenge response and a temporary automatic lock time indicator, and if the challenge response is accepted, unlocking the device, setting an automatic lock timer of the device to a temporary lock time value, and starting the automatic lock timer.

The present disclosure provides an electronic device comprising a processor, a memory capable of storing therein computer readable instructions, and a user interface, wherein the processor is capable of executing the computer readable instructions to receive through the user interface of the device, when the device is in a locked state, a challenge response and a temporary automatic lock time indicator, and if the challenge response is accepted, to unlock the device, set an automatic lock timer of the device to a temporary lock time value, and start the automatic lock timer.

Most existing locking mechanisms are applied on a device or in a system with little or no regard to how the device or system is being used, or to the environment in which the device is located. In some instances, the device may be being used by a user but may not be receiving any input. This can occur when the device is merely providing information to a user, such as displaying information on the display of the device or providing audio output. In such instances, the device receives no input and thus the device does not know whether or it has been left unattended. For example, this situation can arise when a navigation application is being used on an electronic device. It is possible that the automatic lock of the device will engage one or more times before the desired destination is reached if the device does not receive periodic input. In circumstances such as these, the automatic lock of the device may engage even though the device has not been left unattended. Thus the automatic locking of the device where the device is being used but is not receiving any input can be inconvenient and therefore undesirable.

The automatic locking of a device may also be inconvenient where the device is located in a secure environment. For example, a device may be set to automatically enter a locked state if it is idle for a short time period, for example 3 minutes. This automatic lock time value of 3 minutes may be desirable when the device is in an unsecure environment. However, a value of 3 minutes may be inconveniently short when the device is located in a secure environment, such as at a home. While being located in such a secure environment, the device may have to be repeatedly unlocked even though there is little or no risk of unauthorized use of the device. The necessity of repeatedly unlocking the device in a secure environment is inconvenient and thus undesirable.

One or more embodiments of the present disclosure disclosed herein are described with reference to a mobile device. However, this particular type of device is not meant to be limiting. It is contemplated that the present disclosure may be implemented with any other type of communication device or electronic device. Examples of such devices include but are not limited to handheld devices, mobile devices, personal digital assistants (PDAs), personal computers, tablet computers, televisions, e-book readers, media players, gaming devices, etc. Furthermore, the following description of one or more specific embodiments is not intended to limit the implementation of the present disclosure to any particular device architecture, system architecture, operating system, or computer programming language.

The various features and components of the present disclosure are now described with reference to the Figures.

Reference is now made to FIG. 1, which shows an example handheld mobile device 100. Device 100 comprises a user output interface, which can be in the form of a display screen 102. Screen 102 may be for output only or may also function as an input device (e.g. a touch-screen). Device 100 may also have a user input device 104, which can be in the form of a button, scroll wheel, or scroll tab. Device 100 can also comprise a keyboard or keypad (not shown), which can be in the form of a physical keyboard or in the form of a virtual keyboard displayed on a touch-screen version of screen 102. The device may also have other input and/or output devices, such as a speaker 106 and a microphone (not shown).

Many electronic devices such as mobile device 100 have at least one challenge based locking mechanism for improving the security of the device and any data stored on the device. A challenge can be used to authenticate a user who is attempting to access or use a device or system. An example of a challenge is to prompt for a password. However, other types of challenges are possible, including but not limited to biometric methods such as retinal scans and fingerprint scans. One type of challenge based locking mechanism allows a device to be put into a locked state, in which user access to some or all of the functionality of the device is temporarily disabled. The device may be switched into an unlocked state upon the successful completion of a challenge, meaning that user access to some or all of the functionality of the device is enabled.

In at least one embodiment of the present disclosure, the challenge may be in the form of a password prompt. A successful response to the prompt will be a valid password.

FIG. 1 shows one embodiment of the present disclosure in which device 100 is in a locked state. In order to allow the device to be put into an unlocked state, device 100 provides a password prompt in a password field 110 on screen 102. A password may be input into field 110, and if accepted, device 100 will proceed from a locked state into an unlocked state. FIG. 1 shows an example password attempt in field 110 that has been obscured with 'X's (i.e. "XXXXXXX"). In such a scenario, the device may be configured, either through software or otherwise, to start an automatic lock timer. The automatic lock timer will often be set to a certain value so that if there is no user interaction with the device, including no user input to the device, during a given period, the device will proceed into a locked state. While a device receives no input, the device is often referred to as being "idle" or being in an idle state. For example, the automatic lock timer may be set to a value of 1 minute. Thus if the device receives no input for 1 minute, the device will proceed into a locked state. However, if the device receives input before 1 minute elapses, then the automatic lock timer can be restarted.

As described above, device 100 may be configured with an automatic lock time value. Therefore in most or all circumstances when the device becomes idle, the device starts its automatic lock timer, which has been set to this automatic lock time value. The parameters of the automatic lock time, such as time value, may be configurable, possibly in the settings of the device. For example, device 100 can allow for navigation of the settings of the device to alter the value of the default automatic lock time. It may also be possible for the automatic lock timer to be toggled on and off in the settings of the device. Thus the device can provide the option of turning the automatic lock timer off to forgo the security provided by the automatic lock timer. In most existing devices, the settings menus of the device must be navigated in order to disable or enable the automatic lock timer. This can be inconvenient.

In the above embodiment, the automatic lock timer is described as being set to a time value. In at least one embodiment, the automatic lock timer can be set to the time value, and then count down once the timer has been started. In one or more other embodiments, the automatic lock timer starts at a value of zero and count up to the time value. However, the automatic lock timer may be implemented in any other suitable way. Furthermore, a timer need not necessarily be used so long as there is a way of tracking or measuring a certain amount of time on the device. Therefore regardless of how the automatic lock timer is implemented, the automatic lock timer keeps track of or is otherwise able to determine how long the device continuously remains idle. For example, in at least one embodiment, the device uses the 24-hour clock of the device. In this at least one embodiment, the device notes the time at which the device becomes idle, and then determines, based on the automatic lock time value, the time at which the device is to enter a locked state if the device remains idle. Other options for implementing the automatic lock timer are possible.

In most or all circumstances, the device enters a locked state if it has been continuously idle for the duration of the automatic lock time value. This generally occurs regardless of how the device is being used. However, such functionality is not always desirable. In some instances, the device may be being used but not receiving any input. As a result of the device being idle, the device will enter a locked state after a certain amount of time. For example, a GPS navigation feature may be running and displayed on the device. It will typically be desirable for the device to remain in an unlocked state for the duration of the voyage so that the device continuously displays a map or directions on the display. However, since there would typically not be any input provided to the device while navigating, the device would enter a locked state after a certain amount of time. This is usually undesirable. In another example, a user may be having a back and forth conversation with another person over an email, text messaging, or other messaging service. However, depending on the time between responses and the value of the automatic lock timer, the device may enter a locked state before a response to a message can be inputted. This may be undesirable and frustrating.

In one aspect of the present disclosure, an option to temporarily override or suspend the default automatic lock time of a device with a temporary automatic lock time is provided. In many cases, the temporary automatic lock time value will be greater than the default automatic lock time value, thereby allowing the device to remain idle for a longer time period without entering a locked state.

In at least one embodiment, a temporary automatic lock time value can be received by the device (i.e. inputted), for example in the unit of minutes. In at least one other embodiment, a temporary automatic lock time indicator can be received by the device rather than a time value. A temporary automatic lock time indicator can be used where, for example, a temporary automatic lock time value is stored in the device. Therefore in one or more embodiments, a temporary automatic lock time indicator can be received by the device rather than a temporary automatic lock time value. Where an indicator is received by the device, the device can start the automatic lock timer with a temporary automatic lock time value that is stored in the device.

In at least one embodiment of the present disclosure, the option of temporarily overriding or suspending the default automatic lock time can be presented when there is an attempt to unlock the device. FIG. 1 shows one such embodiment of the present disclosure, in which device 100 is in a locked state. A challenge in the form of a password prompt is presented on screen 102 of the device. However, unlike existing challenge based unlocking mechanisms, the challenge based unlocking mechanism of device 100 shown in FIG. 1 allows for the inputting of a temporary automatic lock time value along with a password. In particular, a temporary automatic lock time can be appended to an inputted password. FIG. 1 shows password field 110 into which a password, which has been obscured with 'X's (i.e. "XXXXXXX") and a temporary automatic lock time "15" has been inputted. The unit of time can in minutes or in any other suitable unit. In this particular example, a "+" symbol has been inputted between the password and the time value in order to identify to the device which portion of the inputted string is a password attempt and which is a temporary automatic lock time. However, it is possible to identify the password and the time value to the device in other ways, for example by using a different separating character, including a space.

If the challenge response is accepted by the device, the device enters an unlocked state. In the present embodiment, the challenge response is in the form of a password. If a temporary lock time value has been appended to the password, the device will enter an unlocked state as usual. However, the automatic lock timer will be started with the inputted automatic lock time value rather than the default automatic lock time value. The device can use this temporary automatic lock time value until the next time the device enters a locked state. The next time the device is unlocked, the automatic lock time value is typically set to the default value unless another temporary automatic lock time is inputted to the device. In this embodiment, the temporary automatic lock time value has a one-time use lifespan.

Figure 4:
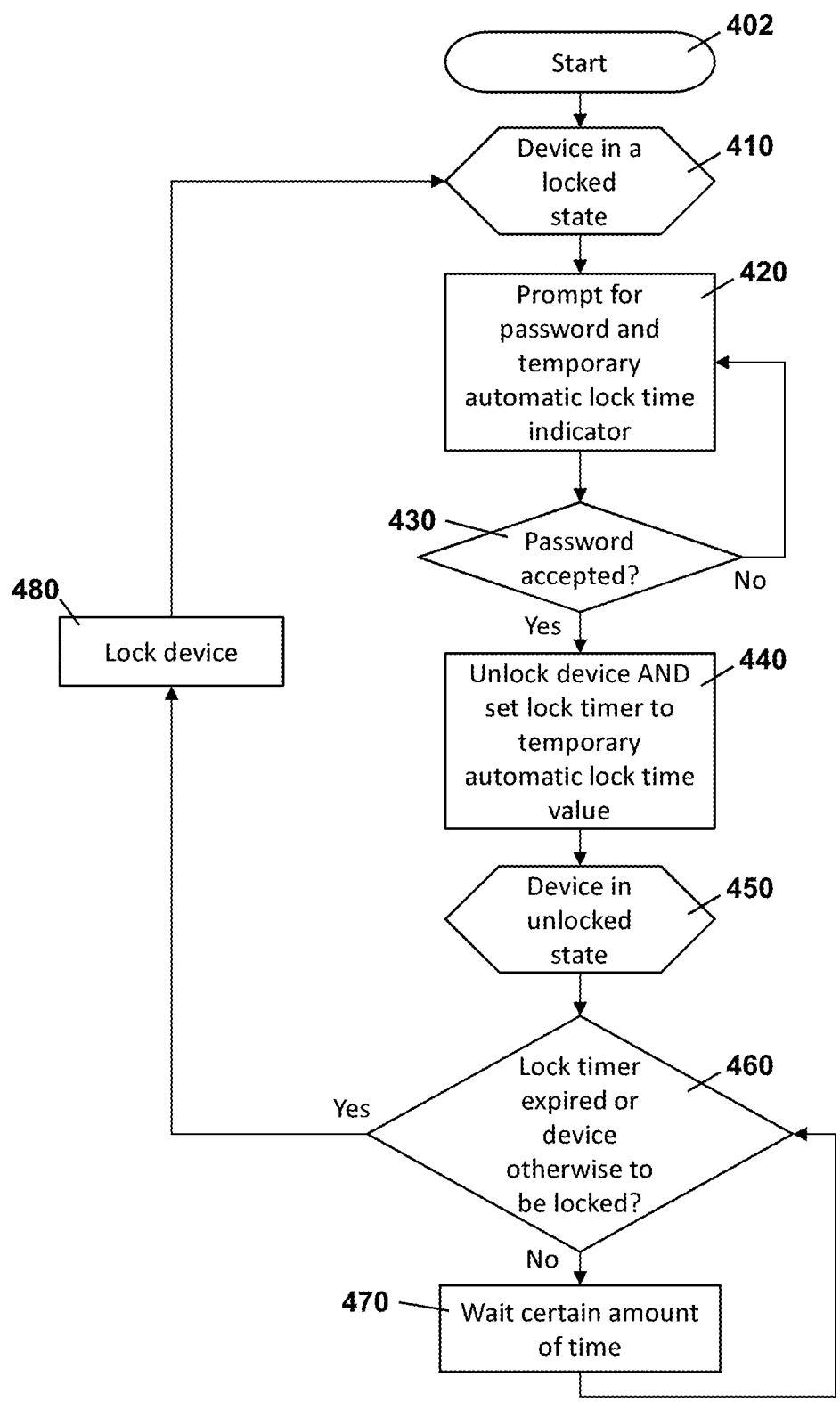
FIG. 4 is a flow chart showing steps of a method according to one aspect of the present disclosure.

The basic steps of a method according to one aspect of the present disclosure are shown in FIG. 4. Specifically, FIG. 4 provides a flow chart which starts at block 402 with the preconditions of block 410 (device is in a locked state), and proceeds to block 420. At block 420, the device prompts for a password and optionally for a temporary automatic lock time indicator. At block 430, the device determines whether or not the inputted password is acceptable. If the password is not accepted, the method proceeds back to block 420 and the device remains in a locked state. However, if the password is accepted, the method proceeds to block 440. At block 440 the device proceeds into an unlocked state and, if a temporary automatic lock time indicator has been inputted, the automatic lock timer of the device is set to a temporary automatic lock time value. The method proceeds through block 450, which indicates that the device is in an unlocked state. At block 460, it is determined if the automatic lock timer has expired or if the device is otherwise to be put into a locked state. If the automatic lock timer has expired, the device has been idle for a period of time equal to or greater than the automatic lock time value. The device may otherwise be put into a locked state for other reasons, for example, if the device is manually locked. If the timer has not expired and the device is not to be locked for other reasons, the method proceeds to block 470 where the method waits a certain amount of time (i.e. a delay). From block 470, the method loops back to block 460. On the other hand, if the timer has expired or the device is to be locked for another reason, the method proceeds to block 480 where the device proceeds into a locked state. The term "expired" is herein used to refer to the instance where an amount of time equal to or greater than a lock time value has elapsed. From block 480, the method proceeds to block 410 indicating that the device is locked, and then to block 420.

After the device has been unlocked with a temporary automatic lock time, it is possible that the device will re-enter the locked state. At some point between the time when the device proceeds into a locked state, and the time when the device is next unlocked and the automatic lock timer is started, the automatic time lock value is reset to its default value unless a temporary automatic lock time indicator is again inputted to the device. Otherwise, the automatic lock timer is set with the default automatic lock time value. As mentioned above, in this sense the temporary automatic lock time value has a one-time use lifespan. The life of the temporary automatic lock time value ends when the device enters a locked state.

Figure 2:
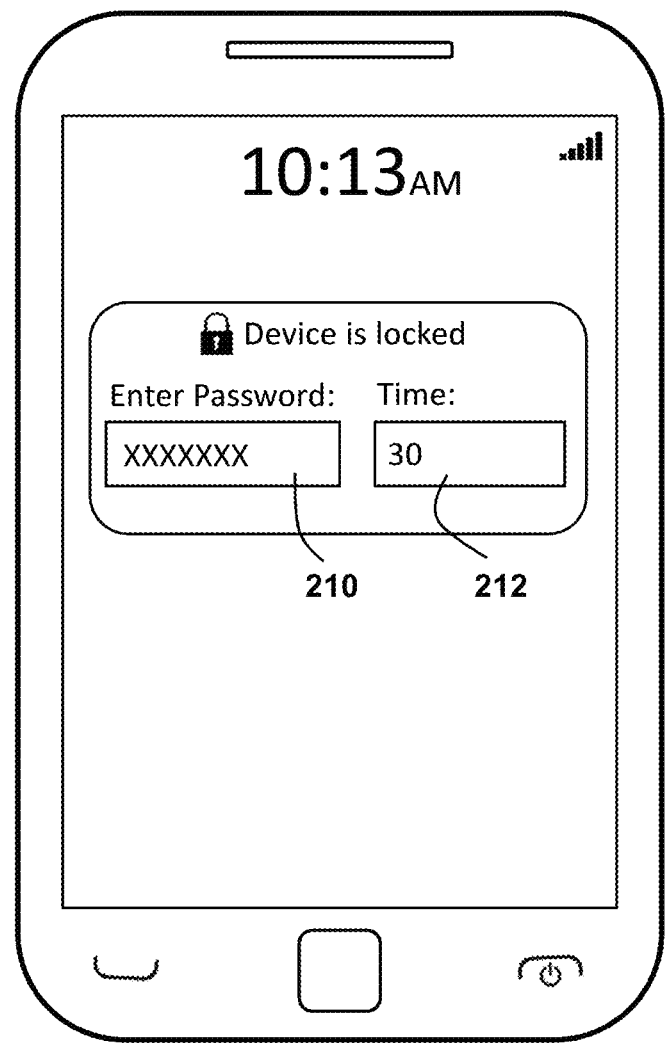
FIG. 2 is a front view of the device shown in FIG. 1 showing another embodiment of a device unlock user interface screen.

FIG. 2 shows another embodiment according to the present disclosure. This embodiment is similar to the embodiment shown in FIG. 1, except that separate password and temporary automatic lock time fields, 210 and 212, respectively, are provided. Thus in this example, a password is entered as a first string in a first field, password field 210, and a temporary automatic lock time is entered as a second string in a second field, temporary automatic lock time field 212.

Figure 3A:
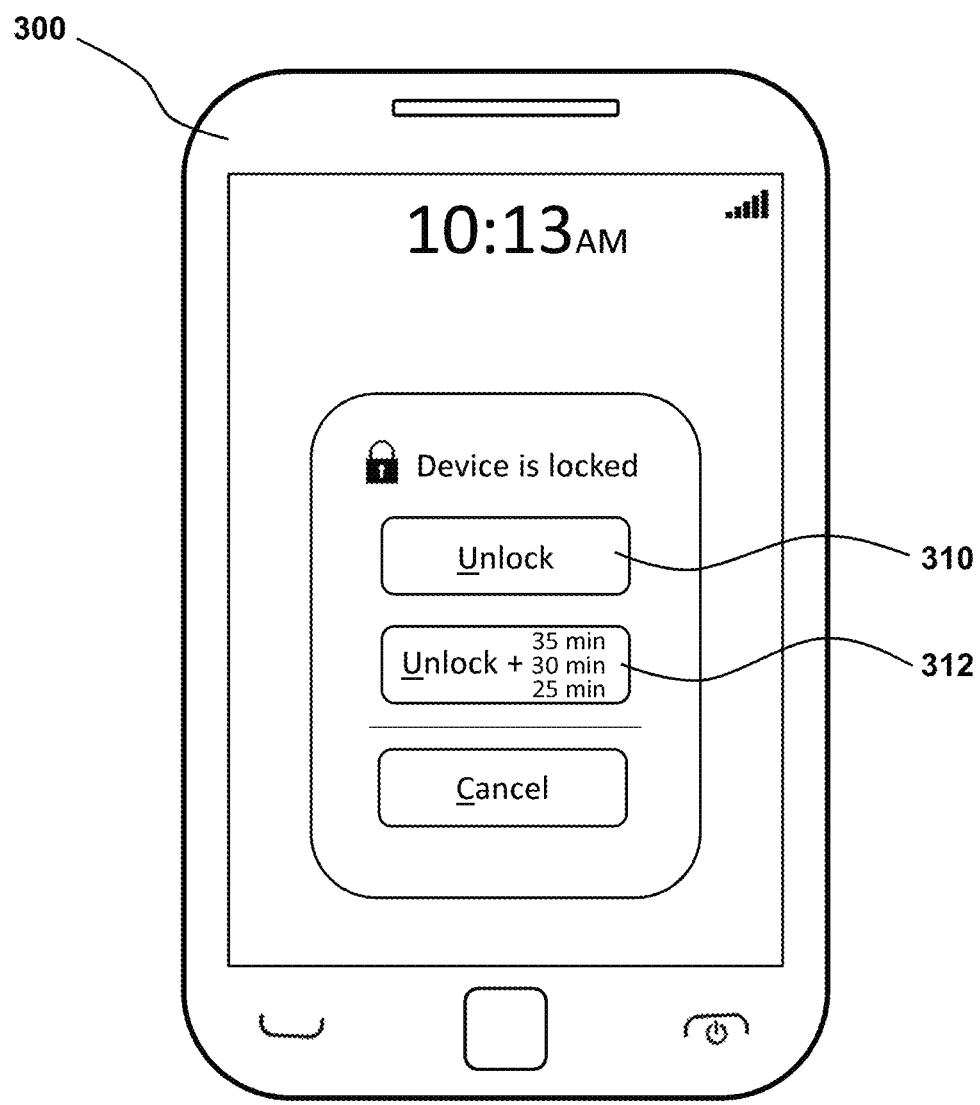
FIG. 3A is a front view of the device shown in FIG. 1 showing yet another embodiment of a device unlock user interface screen.
Figure 3B:
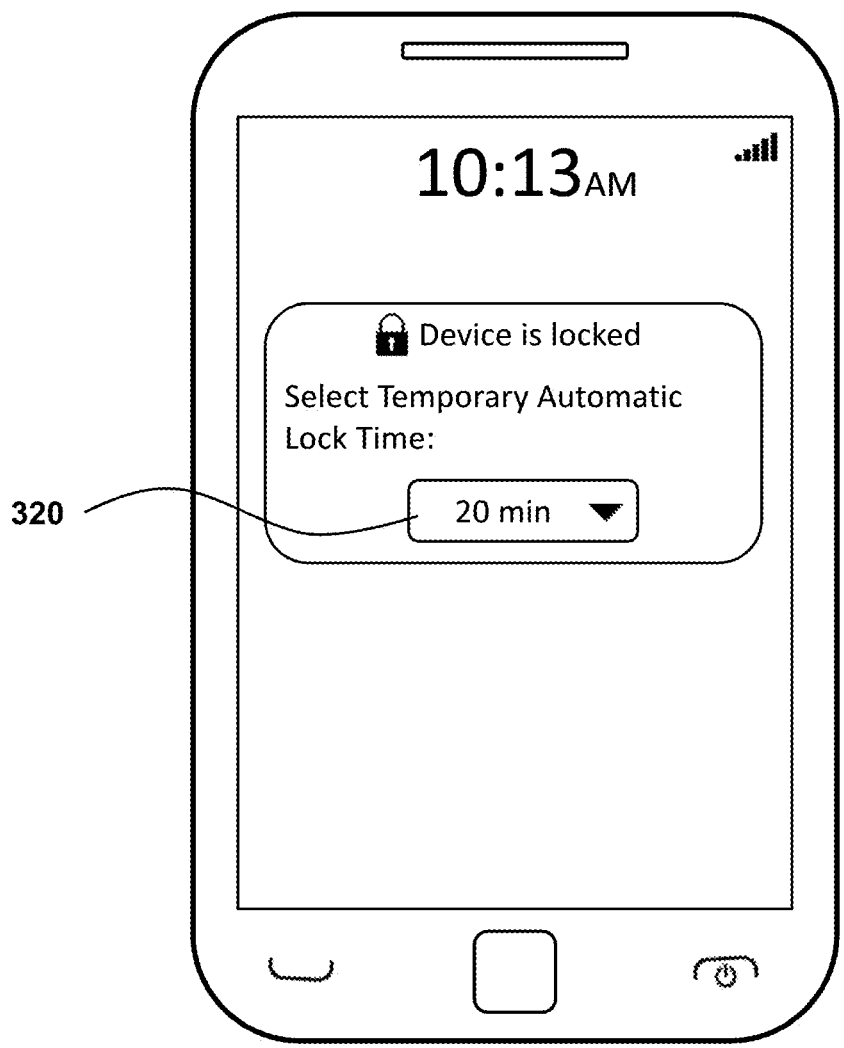
FIG. 3B is a front view the device shown in FIG. 1 showing another device unlock user interface screen according to the embodiment shown in FIG. 3A.

FIG. 3A shows yet another embodiment according to the present disclosure. In this embodiment, device 300 displays a window indicating that the device is locked and comprising several buttons including buttons 310 and 312. Button 310 allows the device to be unlocked without inputting a temporary automatic lock time indicator. In other words, this option allows the device to be unlocked using the default automatic lock time value. Button 310 will cause the device to prompt for a password. Button 312 allows the device to be unlocked and for the selection of a temporary automatic lock time value. This alternative may present a choice of one of one or more temporary time values. For example, the device can present temporary time values of 1, 2, 5, 10, 15, 20, 25, and 30 minutes. Of course, the device will also prompt for a password. In another embodiment, once button 312 has been engaged, the device may display a second window into which a temporary automatic lock time value can be inputted. In this second window, the time value can be entered by inputting a numerical value. Another option, which is shown in FIG. 3B, presents on the screen a list of temporary automatic lock time values, for example in a drop down menu 320. Other options for allowing for the inputting of a temporary automatic lock time value are possible.

The automatic lock mechanism of a device can be implemented on the device in any suitable way, including in software. For example, the automatic lock mechanism can be implemented in a software lock module or as part of another larger software module. Other options are possible.

One or more embodiments of the present disclosure can be implemented on an electronic device in any suitable way. For example, the functionality on a device allowing a temporary automatic lock time indicator or value to be inputted, including the graphical user interface of the device, may be realized using features of the operating system of the device. Other options for implementing one or more embodiments of the present disclosure are possible.

According to at least one aspect of the present disclosure, an electronic device is provided. The electronic device comprises a processor, a memory storing therein computer readable instructions a memory storing therein computer readable instructions, and a user interface. The processor is adapted to execute the computer readable instructions to receive through the user interface of the device, when the device is in a locked state, a challenge response and a temporary automatic lock time indicator. The processor is also adapted to unlock the device if the challenge response is accepted, and if the challenge response is accepted, to further set an automatic lock timer of the device to a temporary lock time value, and start the automatic lock timer.

Figure 5:
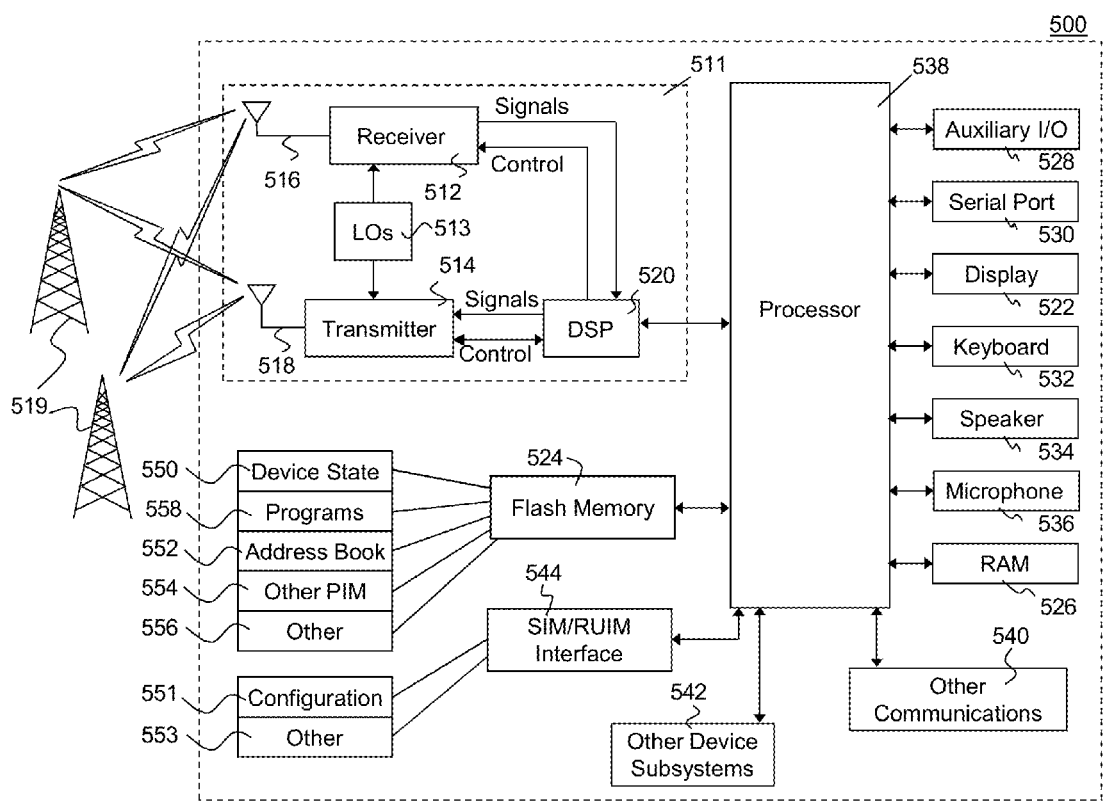
FIG. 5 is a block diagram representing a mobile device according to one aspect of the present disclosure.

An example of such an electronic device includes a mobile wireless communications device depicted in FIG. 5, herein referred to as a mobile device. The mobile device of FIG. 5 is however not meant to be limiting. Other electronic devices are contemplated.

Mobile device 500 may comprise a two-way mobile device having any of voice capabilities, data communication capabilities, or both. Mobile device 500 generally has the capability to communicate with other devices or computer systems. Depending on the exact functionality provided, the mobile device may be referred to as a data messaging device, a wireless e-mail device, a cellular telephone, a wireless Internet appliance, a wireless device, a user equipment, a tablet, a mobile computer, or a data communication device, as examples.

Where mobile device 500 is enabled for two-way communication, it may incorporate a communication subsystem 511, including both a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some networks, network access is associated with a subscriber or user of mobile device 500. A mobile device may require a removable user identity module (RUIM) or a subscriber identity module (SIM) card in order to operate on the network. The SIM/RUIM interface 544 may be similar to a card-slot into which a SIM/RUIM card can be inserted and ejected like a diskette or PCMCIA card. The SIM/RUIM card can have memory and hold many key configuration 551, and other information 553 such as identification, and subscriber related information.

When required network registration or activation procedures have been completed, mobile device 500 may send and receive communication signals over the network 519. As illustrated in FIG. 5, network 519 can consist of multiple base stations communicating with the mobile device. For example, in a hybrid CDMA 1x EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 516 through communication network 519 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532 being either physical or virtual, speaker 534, microphone 536, other communication subsystem 540 such as a short-range communications subsystem and any other device subsystems generally designated as 542. Serial port 530 can include a USB port or other port known to those in the art having the benefit of the present disclosure.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list, among other applications.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. The applications may be segregated based on the mode or category they fall into. Memory 524 may further provide security for corporate data and if some applications are locked while others are not.

Processor 538, in addition to its operating system functions, may enable execution of software applications on the mobile device. A set of applications that control basic operations, including data or voice communication applications for example, can be installed on mobile device 500 during manufacturing. Other applications can be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory.

One example software application may be a personal information manager (PIM) application having the ability to organize and manage data items relating to the user of the mobile device such as, but not limited to, e-mail, calendar events, voice mails, appointments, and task items. Further applications, including, but not limited to, a media player, camera, messenger, mail, calendar, address book, web browser, social networking, game, electronic book reader, map, or other application may also be loaded onto the mobile device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both. For example, secure communication applications may enable electronic commerce functions and other such financial transactions to be performed using the mobile device 500.

In a data communication mode, a received signal such as a text message or web page download will be processed by the communication subsystem 511 and input to the processor 538, which may further process the received signal for output to the display 522, or alternatively to an auxiliary I/O device 528.

Mobile device 500 may also allow for the composition of data items such as email messages for example, using a keyboard 532, which may comprise a virtual or physical keyboard or both, and may include a complete alphanumeric keyboard or telephone-type keypad, among others, in conjunction with the display 522 and possibly an auxiliary I/O device 528. Such composed items may then be transmitted over a communication network through the communication subsystem 511.

For voice communications, overall operation of mobile device 500 is similar, except that received signals can be output to one or more speakers 534 and signals for transmission can be generated by a microphone 536. Alternative voice or audio I/O subsystems, such as a voice message recording subsystem, may also be implemented on mobile device 500. Although voice or audio signal output may be accomplished primarily through the one or more speakers 534, display 522 may also be used to provide an indication of the identity of a calling party, the duration of a voice call, or other voice call related information for example.

Serial port 530 in FIG. 5 can be implemented in a personal digital assistant (PDA)-type mobile device for which synchronization with a desktop computer (not shown) may be desirable, but is an optional device component. Such a port 530 can allow for the setting of preferences through an external device or software application and can extend the capabilities of mobile device 500 by providing for information or software downloads to mobile device 500 other than through a wireless communication network. The alternate download path may for example be used to load an encryption key onto the device through a direct and thus reliable and trusted connection to thereby enable secure device communication. As will be appreciated by those skilled in the art, serial port 530 can further be used to connect the mobile device to a computer to act as a modem. As described above, serial port 530 can support any type of serial communication, including but not limited to USB.

Other communications subsystems 540, such as a short-range communications subsystem, are further optional components which may provide for communication between mobile device 500 and different systems or devices, which need not necessarily be similar devices. For example, the subsystem 540 may include an infrared device and associated circuits and components, near field communications (NFC) or a Bluetooth™ communication module to provide for communication with similarly enabled systems and devices. Subsystem 540 can be used to establish a communication link between device 500 and another wireless device.

According to another aspect of the present disclosure, a locking mechanism that utilizes information on the location or environment of the electronic device is provided. The settings or parameters of a locking mechanism can be adjusted based on the environment of the device. The settings and parameters of the locking mechanism for a specific environment are herein referred to as a "locking profile" for the specific environment. An example of a setting or parameter that can be adjusted based on the environment of the device is the automatic lock time of the locking mechanism. Other settings or parameters can include the type of challenge that is employed to unlock the device (e.g. a password), and the length of such a password. For example, a separate, shorter, password may be allowed in a secure environment. As discussed above, it is sometimes desirable to have a longer automatic lock time, or to altogether disable the locking mechanism of the device, when the device is in an environment that is known to be secure. Examples of possibly secure environments include an office, home, and vehicle, to name but a few.

Figure 6:
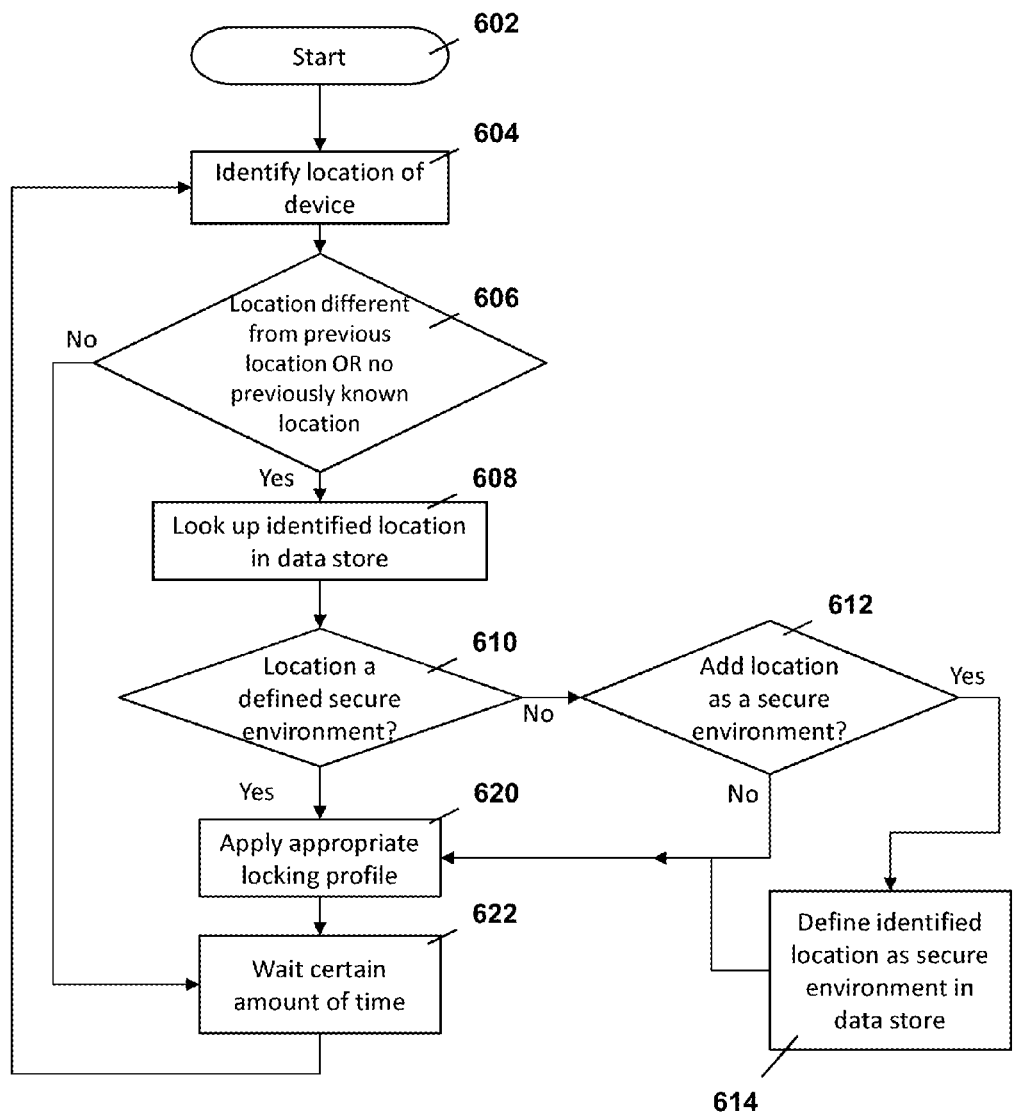
FIG. 6 is a flow chart showing the steps of an environment based locking method according to another aspect of the present disclosure.

The basic steps of a method according to one aspect of the present disclosure are shown in FIG. 6. Specifically, FIG. 6 provides a flow chart which starts at block 602. The device lock process is configured to provide different security settings for device locking based on a perceived location or environment of the device. For example, if the device is perceived to be in a secure environment, security settings that are less stringent but more convenient can be applied. If the device is perceived to be in an insecure environment, security settings that are more stringent but less convenient can be applied.

From start block 602, the process proceeds to block 604 in which the device identifies its location or environment. The device can attempt to identify its location or environment in any suitable way. For example, in at least one embodiment, the device can use GPS technology to determine its geographical coordinates. In at least one other embodiment, the device can triangulate its position based signal strengths of nearby base stations. In one or more other embodiments, the device can identify its location based on a connection between the device and a known other entity. For example, the device can recognize its environment when the device is connected to a home personal computer or to a vehicle over Bluetooth or near field communication (NFC). Another example includes the device being connected to and recognizing a known network, such as a home or office Wi-Fi™ network. Other examples include the device recognizing known Bluetooth connections, as well as other wired and wireless connections.

The process then proceeds to block 606, where it is determined whether the identified location or environment of the device is different from the previous location of the device, or if there is no previously known location of the device (e.g. if the device was just powered up). In at least one embodiment, if the identified location of the device is the same as the previously identified location of the device, then the currently applied automatic locking profile of the device is unchanged. In this situation, the process proceeds to block 622, which is discussed below. However, if the identified location or environment of the device is different from the previous location of the device, or if there is no previously known location of the device, then the process proceeds to block 608.

At block 608, the identified location of the device is looked up in a data store, which may be on the device. The data store can contain, among other data, a list of one or more secure environments known to the device. In addition, the data store can also include one or more locking profiles for one or more of the known secure environments. A locking profile can be applied to the device when the device is in the particular known environment. From block 608, the process proceeds to block 610 where the device checks to see if it recognizes its environment as a known or "defined" secure environment. If the identified location is a defined secure environment, then the process proceeds to block 620, at which a locking profile corresponding to the known secure environment is applied on the device. If, however, the identified location of the device is not defined in the data store as a secure environment, the process proceeds to block 612.

At block 612, the device can provide the opportunity to define the identified location as a secure environment. If the identified location is to be defined as a secure environment, the process proceeds to block 614 where information on the identified location can be added to the data store. This information can include settings for a locking profile for the new secure environment, for example an automatic lock time value. The process then proceeds to block 620. On the other hand, if the identified location of the device is not a defined secure environment, and the location is not to be defined as being secure, then the process proceeds to block 620. At block 620, an appropriate locking profile is applied on the device. If the identified location of the device is a secure environment, then a locking profile specific to the environment can be applied. However, if the identified location of the device is not a secure environment and the environment is not to be defined as a secure environment, then another locking profile can be applied on the device. An example of another locking profile is a default locking profile of the device. For example, a default locking profile may, among other things, automatically lock the device when the device has been idle for more than 'X' minutes.

After block 620, the process proceeds to block 622, where the process waits for a certain amount of time before proceeding back to block 604 to again identify the location of the device. A purpose of block 622 is to have the process wait an amount of time before it checks to see if the device has changed environments or locations.

In at least one embodiment, the settings used by the locking mechanism of the device can depend on the location of the device relative to another entity, for example a desktop computer. This aspect of the present disclosure is herein described with reference to a desktop computer. However this aspect of the disclosure can be implemented with any other entity or equipment.

Figure 7:
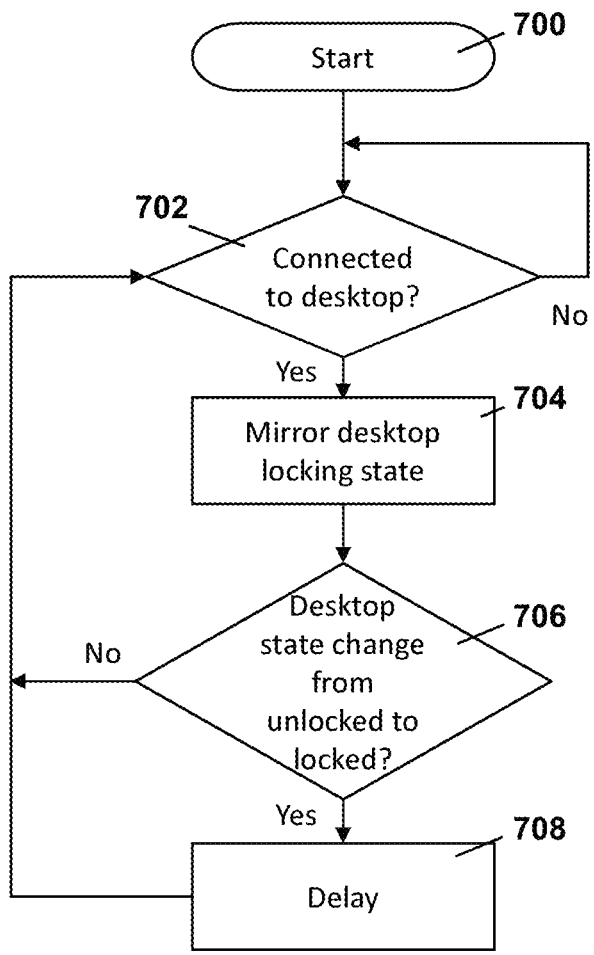
FIG. 7 is a flow chart showing the steps of a method according to another aspect of the present disclosure.

In at least one embodiment of the present disclosure, the device can communicate through a local interface with a local desktop computer. The interface may for example include a docking station or cradle that physically connects to a serial port or other port of the device, or can be a short-range wireless interface for communicating with the short range communications system of the mobile device. The device locking mechanism in example embodiments adapts its behavior depending on whether the device is docked or otherwise in local communication with a desktop computer. In this regard, reference is now made to FIG. 7, which shows an example process performed by a locking mechanism. In the embodiment represented by the process shown in FIG. 7, the desktop computer is configured to communicate its current lock state (unlocked or locked) to a locally connected electronic device, and the device is configured to mirror the lock state of the desktop computer.

The process starts at block 700, and proceeds to block 702 at which there is a monitoring step to determine if the device is locally connected to desktop computer. If the device is locally connected to the desktop computer, then the lock state of the device is set to be the same as that of the desktop computer (block 704). At block 706, the locking mechanism of the device monitors for a change in the lock state of the desktop computer from unlocked to locked. If the desktop lock state has not changed from unlocked to locked, the locking mechanism of the device continues to check to see if the device is still locally connected to the desktop computer, and if so maintain the device in the same lock state as desktop computer. If, however, at block 706 a change in the lock state of the desktop computer from unlocked to locked is detected, then the process proceeds to block 708 at which a preset time delay occurs. From block 708, the process proceeds to block 702 where a determination is made if the device is still locally connected to the desktop computer. If the device is still locally connected, then the device will also enter a locked state. The delay at block 708, which may by way of non-limiting example be in the range of a few seconds to a few minutes, is provided to allow a user time to lock their desktop computer and then remove their device from its docking station (thereby severing the local connection with desktop computer). If the device is not removed from its docking station within the delay provided at block 708, an assumption is made that the device has been left unattended with the desktop computer and so it is then immediately locked.

In a further example embodiment, as part of the delay step in block 708, the device displays a question asking whether the device is to be locked. If the device does not receive a reply within the delay time confirming that the device should not be locked, then the process continues to block 702 and will lock the device if it is still connected to the desktop. If, however, the device receives confirmation within the delay time that the device is not to be locked, then the device will ignore the locked state of the desktop and rely on its own internal device automatic lock timer instead.

Figure 8:
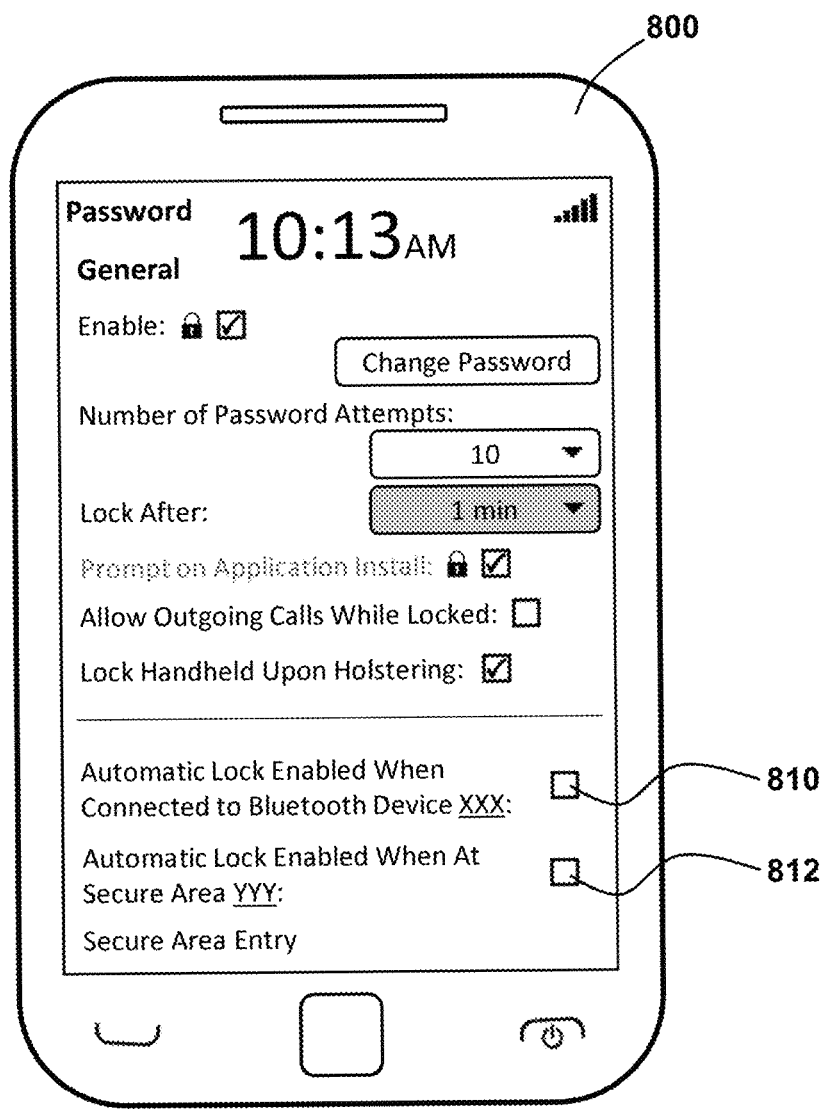
FIG. 8 is a front view of an example mobile device showing a device locking mechanism settings user interface screen according to one aspect of the present disclosure.

Reference is now made to FIG. 8, which shows an example user interface screen on a device which allows for automatic locking of the device based on the environment of the device. FIG. 8 generally shows a screen displaying some password locking mechanism settings of device 800. In addition to displaying some settings common on mobile devices, two additional settings are provided. Device 800 provides the choice of enabling or not enabling the automatic lock when the device is connected to Bluetooth device 'XXX'. The device also provides the choice of enabling or not enabling the automatic lock when the device is located at secure area 'YYY'. In the example shown in FIG. 8, these two selections are made by way of check boxes 810 and 812, respectively. Therefore these settings allow for the selective enablement or disablement of the locking mechanism of the device based on the environment of the device.

Figure 9:
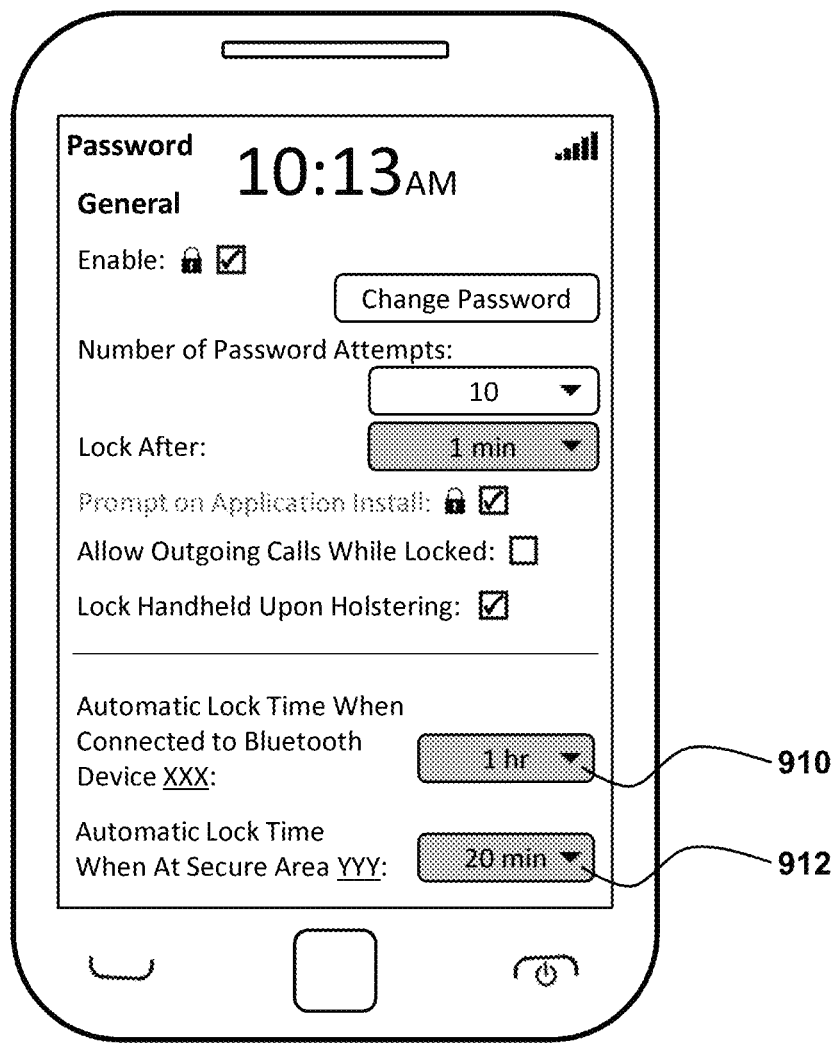
FIG. 9 is a front view of the device shown in FIG. 8 showing a device locking mechanism settings user interface screen according to one aspect of the present disclosure.

FIG. 9 shows another example user interface screen on a device from which automatic lock time values can be selected when the device is connected to Bluetooth device 'XXX' and when it is located at secure area 'YYY'. In this embodiment, the automatic lock time values can be selected by way of drop down windows 910 and 912, respectively.

FIG. 8 and FIG. 9 are illustrative examples and are not meant to be limiting. Other graphical user interfaces, settings, setting layouts, and other options for implementing one or more aspects of the present disclosure are possible.

According to yet another aspect of the present disclosure, a stimulus based locking mechanism is provided.

In at least one embodiment, the stimulus based locking mechanism attempts to distinguish between two different cases where an electronic device has not been subjected to any input for a duration of time. In one case, the device is not being used because it is unattended. In such a case it is desirable to lock the device as quickly as possible as it may be in an unsecured setting and thus require a high degree of security protection. In the alternative case, the device is not unattended, however the device is not being used. For example, the device has not outputted any notifications as a result of any received new emails, messages, phone calls or calendar reminders and has not sent received any input, for example any emails or phone calls. In this alternative case, the device is presumably in a secure setting and an immediate device lock is not required.

By distinguishing between the above two cases, a stimulus based locking mechanism that balances convenience and security can be provided. For example, in a device locking mechanism that does not distinguish between the two cases, greater security can be provided by always locking a device after a relatively short period of no input. However such locking after a short period can be inconvenient and unnecessary when the device is not unattended. In order to distinguish between the two cases, according to aspects of the present disclosure, it is assumed that a user of a device will generally respond and interact with the device when the device issues a stimulus. For example, events on the device such as an incoming phone call or a new email or a calendar reminder will typically be accompanied by a stimulus such as an audible sound such as a beep or a physical prompt such as a vibration, and if the device is not unattended the device will usually receive input shortly after the stimulus has issued. Thus, it is assumed that if there is no input in reaction to a stimulus then the device is unattended. Based on such assumptions, the stimulus based device locking mechanism can be configured to use a shorter automatic lock time value for locking the device after a stimulus is issued than the automatic lock time value that is used if a stimulus is not issued.

Figure 10:
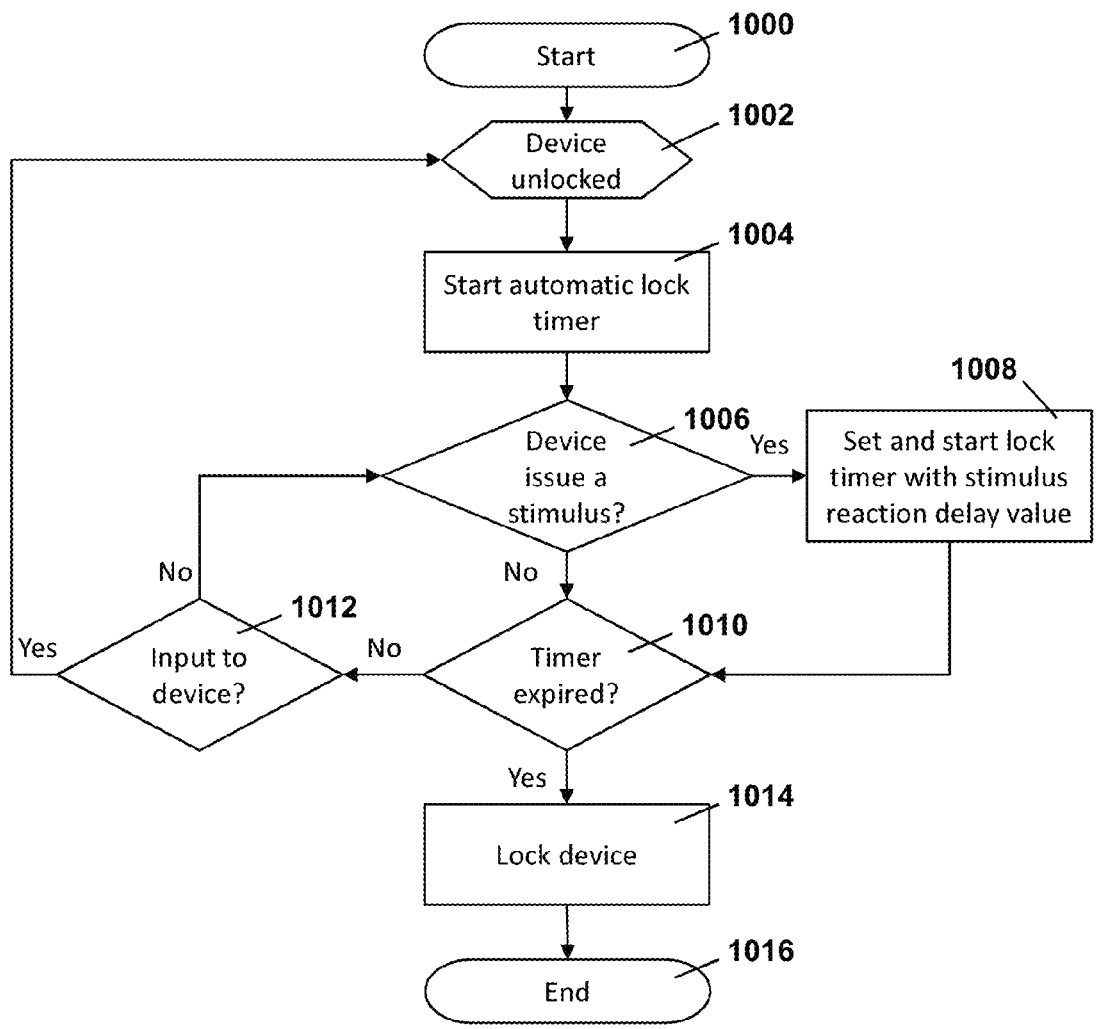
FIG. 10 is a flow chart showing steps of a stimulus based locking method according to another aspect of the present disclosure.

The basic steps of a method according to one aspect of the present disclosure are shown in FIG. 10. In particular, FIG. 10 provides a flow chart which starts at block 1000 with the condition of block 1002 (device is in an unlocked state), and proceeds to block 1004. At block 1004, an automatic lock timer of a device is started with a default time value, which can be any suitable value. At block 1006, it is determined whether the device has issued a stimulus. The device may issue a stimulus for any suitable reason. For example, events on the device such as an incoming phone call or a new email or a calendar reminder will typically be accompanied by a stimulus such as an audible sound such as a beep or a physical prompt such as a vibration. If a stimulus has been issued, then the process proceeds to block 1008 where the automatic lock timer is set and started with a stimulus reaction delay time value. In at least one embodiment, the stimulus reaction delay time will be less than the default lock time value set in block 1004. The process then proceeds, from either block 1006 or 1008, to block 1010, where it is determined if the automatic lock timer has expired. If the timer has expired then the process proceeds to block 1014 where the device is put into a locked state. The process then proceeds to end block 1016. However if the automatic lock timer has not expired, the process proceeds to block 1012 where it is determined if there has been any input to the device. If there has been input to the device, then it is assumed that the device is not unattended and therefore the device remains in the unlocked state as indicated in block 1002. The automatic lock timer is then restarted with the default time value at block 1004. However if there has been no input at block 1012, then the process proceeds back to block 1006 where it is again determined whether the device has issued a stimulus.

In at least one embodiment of the present disclosure, the stimulus reaction delay time can be inputted to the device. In at least one embodiment, the stimulus reaction delay time can be set automatically on the device. Furthermore, the value of a stimulus reaction delay time can depend on the type of stimulus that is issued. For example, a stimulus reaction delay time for a received email can be different from a stimulus reaction delay time for a calendar event reminder.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Furthermore, the previous detailed description is provided to enable any person skilled in the art to make or use the present disclosure. Various modifications to those embodiments will be readily apparent to those skilled in the art, and the generic principles defined herein may be applied to other embodiments without departing from the scope of the disclosure described herein. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A method in an electronic device, the method comprising, at the device:
   storing on the electronic device, a temporary automatic lock time value;
   receiving, through a user input interface of the device when the device is in a locked state, a challenge response; and
   if the challenge response is accepted:
   unlocking the device;
   if a temporary automatic lock time indicator is received with the challenge response, setting an automatic lock timer of the device to the temporary automatic lock time value based on the temporary automatic lock time indicator;
   if the temporary automatic lock time indicator is not received with the challenge response, setting the automatic lock timer of the device to a default value; and
   starting the automatic lock timer, the automatic lock timer causing the device to transition to the locked state upon expiry,
   wherein the temporary automatic lock time value has a one-time use lifespan and the automatic lock timer resets to the default value after one-time use of the temporary automatic lock time value.

2. The method of claim 1 wherein the challenge response is in the form of a password.

3. The method of claim 1 wherein the next time the device is unlocked, the automatic lock timer is started with a default time value unless a further temporary automatic lock time indicator is received by the device.

4. The method of claim 3 wherein the default time value is different from the temporary automatic lock time value.

5. The method of claim 1 further comprising the step of locking the device when the automatic lock timer expires and there has been no input to the device between the time the automatic lock timer was started and the time when the automatic lock timer expires.

6. electronic device comprising:
a processor;
a memory capable of storing therein computer readable instructions; and
a user interface,
wherein the processor is capable of executing the computer readable instructions to:
  store, on the electronic device, a temporary automatic lock time value;
  receive through the user interface of the device, when the device is in a locked state, a challenge response; and
  if the challenge response is accepted:
  unlock the device;
  if a temporary automatic lock time indicator is received with the challenge response, set an automatic lock timer of the device to the temporary automatic lock time value;
    if the temporary automatic lock time indicator is not received with the challenge response, set the automatic lock timer of the device to a default value; and
    start the automatic lock timer, the automatic lock timer causing the device to transition to the locked state upon expiry,
  wherein the temporary automatic lock time value has a one-time use lifespan and the automatic lock timer resets to the default value after one-time use of the temporary automatic lock time value.

7. The device of claim 6 wherein the challenge response is in the form of a password.

8. The device of claim 6 wherein the next time the device is unlocked, the automatic lock timer is started with a default time value unless a further temporary automatic lock time indicator is received by the device.

9. The device of claim 8 wherein the default time value is different from the temporary automatic lock time value.

10. The device of claim 6 wherein the device is locked when the automatic lock timer expires and there has been no input to the device between the time the automatic lock timer was started and the time when the automatic lock timer expires.

11. A non-transitory computer-readable storage medium comprising computer-executable instructions for execution by an electronic device, the instructions comprising code for:
  storing on the electronic device, a temporary automatic lock time value;
  receiving, through a user input interface of the device when the device is in a locked state, a challenge response; and
  if the challenge response is accepted:
  unlocking the device;
  if a temporary automatic lock time indicator is received with the challenge response, setting an automatic lock timer of the device to the temporary automatic lock time value;
    if the temporary automatic lock time indicator is not received with the challenge response, setting the automatic lock timer of the device to a default value; and
    starting the automatic lock timer, the automatic lock timer causing the device to transition to the locked state upon expiry,
  wherein the temporary automatic lock time value has a one-time use lifespan and the automatic lock timer resets to the default value after one-time use of the temporary automatic lock time value.

12. The non-transitory computer-readable medium of claim 11, wherein the challenge response is in the form of a password.

13. The non-transitory computer-readable medium of claim 11, wherein the next time the device is unlocked, the automatic lock timer is started with a default time value unless a further temporary automatic lock time indicator is received by the device.

14. The non-transitory computer-readable medium of claim 13, wherein the default time value is different from the temporary automatic lock time value.

15. The non-transitory computer-readable medium of claim 11, the instructions further comprising code for locking the device when the automatic lock timer expires and there has been no input to the device between the time the automatic lock timer was started and the time when the automatic lock timer expires.

* * * * *